United States Patent [19]

Sakazaki et al.

[11] 3,879,137

[45] Apr. 22, 1975

[54] CONTROL CIRCUIT FOR AN EXPOSURE METER

[75] Inventors: Tadazumi Sakazaki; Hirokazu Ando, both of Tokyo, Japan

[73] Assignee: Asahi Kogaku Kogyo Kabushiki Kaisha, Tokyo, Japan

[22] Filed: Sept. 19, 1973

[21] Appl. No.: 398,810

[30] Foreign Application Priority Data

Sept. 22, 1972 Japan .............................. 47-109495

[52] U.S. Cl. .................. 356/218; 307/293; 354/23; 354/60

[51] Int. Cl. ............................................. G01j 1/42

[58] Field of Search ................ 307/293; 315/82, 83; 356/218–227; 354/23, 53–57, 60

[56] References Cited

UNITED STATES PATENTS 3,798,500 3/1974 Florence et al. ...................... 315/82

*Primary Examiner*—Ronald L. Wibert
*Assistant Examiner*—F. L. Evans
*Attorney, Agent, or Firm*—Steinberg & Blake

[57] ABSTRACT

An exposure meter control circuit which controls the duration of the operation of the exposure meter by determining the time during which the meter is energized from an electrical energy source. The control circuit has a grounded-emitter transistor with the exposure meter connected as the output load thereof and coupled across the electrical energy source for passing current from the source to the exposure meter when the transistor is in a conductive state. A timing circuit, including a capacitor and resistor connected in parallel, is electrically connected to the base of the transistor. A switching device serially connected between the timing circuit and the electrical energy source, when placed in a closed position, instantaneously charges the capacitor with a voltage from the energy source, whereby the voltage across the capacitor is applied to the base of the transistor rendering it conductive until the voltage across the capacitor discharges through the resistor.

9 Claims, 4 Drawing Figures

CONTROL CIRCUIT FOR AN EXPOSURE METER

BACKGROUND OF THE INVENTION

The present invention relates to exposure meters.

In particular, the present invention relates to a timing control circuit for exposure meters.

As is well known, an exposure meter is frequently utilized in connection with a camera to obtain a proper light measurement to be subsequently utilized in the operation of the camera. In conventional exposure meters an energy source is provided in series with a switch to energize the exposure meter when the switch is in a closed position. The switch is therefore initially closed and a proper light measurement is taken by the exposure meter, after which the switch is opened either manually or, when the switch is interconnected with the shutter button of a camera, by action of mechanism responding to shutter button operation the switch connected to the exposure meter is automatically opened. In this manner the energy is not constantly supplied to the exposure meter, to be wasted, and the exposure meter is only energized during light measurement operation.

However, if the user does not open the switch after the light measurement or, in those cases wherein the switch is coupled to the shutter button, if the user does not in fact carry out a complete photographic operation with the camera, then the switch interconnecting the energy source with the exposure meter remains closed so that the circuitry in the exposure meter continues to operate, thereby wasting energy from the energy source.

SUMMARY OF THE INVENTION

It is accordingly a primary object of the present invention to provide a control circuit for controlling exposure meter operation in a manner which will avoid the above problems of the prior art devices.

In particular, it is an object of the present invention to provide for an exposure meter a control circuit operating so that after a certain predetermined time the energy source energizing the exposure meter is automatically disconnected from the exposure meter thus preventing wasteful consumption of energy.

In particular, it is an object of the present invention to provide a control circuit which includes a timing circuit interconnected with a switching element to control the duration of time during which the switching element remains closed.

In addition, it is an object of the present invention to provide a control circuit which includes a transistor device which has a negative temperature coefficient so that with decreased temperatures the time duration of the operation of the exposure meter decreases, thereby further saving the energy source.

Thus, it is an object of the present invention to provide a control circuit of the above type which is far more efficient than previously known similar circuits while at the same time being simpler in construction and more reliable in its operation.

According to the invention a control circuit for controlling the duration of operation of an exposure meter is electrically connected between the exposure meter and a source of electrical energy. The control circuit comprises a grounded-emitter transistor with the exposure meter connected as the load circuit thereof. The transistor is interconnected across the energy source and, when in a conductive state, permits current to pass from the energy source through the exposure meter. A timing circuit including a capacitor and a resistor, connected in parallel, is electrically connected to the base of the transistor. A switching circuit is connected between the timing circuit and the electrical energy source for instantaneously charging the capacitor with a voltage from the energy source when the switch is in a closed position, so that the voltage across the capacitor is applied to the base of the transistor rendering it conductive until the voltage across the capacitor discharges through the resistor.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
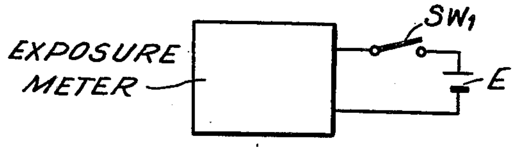
FIG - 1 PRIOR ART
FIG. 1 is a schematic block diagram illustrating a conventional prior art control circuit of an exposure meter.

Referring first to FIG. 1 there is shown a conventional arrangement of an exposure meter shown interconnected with an energy source E which typically supplies a current to the meter. The energy source is serially connected to the exposure meter through a switch $SW_1$. Closure of the switch $SW_1$ energizes the exposure meter and permits light measurement to be made. Subsequent to the light measurement, the switch $SW_1$ is opened either manually, or, when the switch $SW_1$ is coupled to the shutter button of the camera, depression of the shutter button actuates a mechanism which automatically opens the switch $SW_1$. However, should the switch $SW_1$not be opened by the user, or should the photographic operation be only partially completed, the switch $SW_1$ remains in a closed position so that the circuitry in the exposure meter continues to be energized from the energy source and the energy is wasted.

Figure 2:
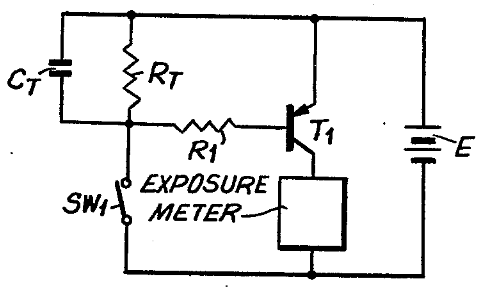
FIG. 2 is a circuit diagram of one embodiment of the present invention.

Referring now to FIG. 2 the principle according to which the present invention operates will now be described. As is well known, in a grounded-emitter transistor circuit, if the base-emitter voltage $V_{BE}$ is below the threshhold level of the transistor, the transistor will be non-conducting and there will hardly be any flow of collector current. On the other hand, if the base-emitter voltage $V_{BE}$ is above the threshhold level, and the base current $I_B$ is greater than $I_C/h_{FE}$, representing the collector current divided by the forward current ratio, then the transistor is saturated so that the collector to emitter voltage $V_{CE}$ is approximately or identically equal to zero, and the collector current is determined through the load resistance and the voltage source.

Utilizing the above discussed principles, a grounded-emitter transistor $T_1$ is connected with the exposure meter placed in the collector circuit thereof, and the transistor and exposure meter are connected across the voltage source E. A timing circuit including a capacitor $C_T$ in parallel with a resistor $R_T$ is interconnected between the emitter and the base through the series base resistor $R_1$. A switch $SW_1$ is interconnected between the energy source E and the timing circuit.

The operation of the circuit shown in FIG. 2 is as follows:

When the switch $SW_1$ is closed, the capacitor $C_T$ is instantaneously charged so that the voltage across the capacitor $C_T$ is approximately equal to the source voltage E. This voltage is then applied to the base of the transistor $T_1$ through the resistor $R_1$ so that the transistor $T_1$ is saturated and current flowing from the energy source E can pass through and energize the exposure meter. The charge across the capacitor $C_T$ gradually discharges through the parallel-connected resistor $R_T$ so that after a certain time, determined by the values of $C_T$ and $R_T$, the voltage across the capacitor $C_T$ becomes less than the required threshhold level of the transistor $T_1$. The transistor $T_1$ will then be cut off so as to become non-conductive whereby the current supply to the exposure meter circuit is terminated. In this manner, even if the user should forget to open the switch $SW_1$ or complete the photographing operation, the exposure meter will stop operating after a predetermined time period, and current will no longer be drawn from the energy source E.

Because the switch $SW_1$ need not be closed throughout the operation of the exposure meter, it is possible to utilize a switch of the push button type for switch $SW_1$ such that when it is closed it will cause the capacitor $C_T$ to become energized and subsequent to closure of the push button switch, the switch will automatically open, when manually released, leaving the capacitor $C_T$ charged and in control of the time duration of the operation of the exposure means. The advantage is that since the closure of the switch $SW_1$ causes instananeous charging of the capacitor $C_T$ it is not necessary to keep the switch $SW_1$ closed during the entire light measurement operation, and the user can merely close the switch $SW_1$ and then pay attention to the light measurement operation without necessarily remembering to reopen the switch $SW_1$. If an automatic opening switch $SW_1$ is utilized, the switch will open by itself.

Figure 3:
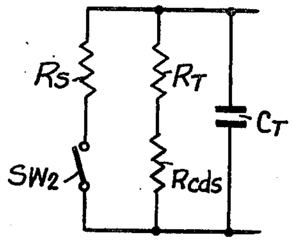
FIG. 3 is a circuit diagram of part of a second embodiment of the invention.

Referring now to FIG. 3 part of another embodiment of a timing circuit is shown. The illustrated timing circuit now comprises a capacitor $C_T$ in parallel with two series-connected resistors $R_T$ and $R_{cds}$. The resistor $R_{cds}$ represents the resistance of a cadmium sulfide element which is located in the control circuitry but is different from the light receiving element utilized in the exposure meter. In parallel with the aforementioned series-connected resistance elements there is a resistor $R_S$ connected in series with a second switch $SW_2$. The resistance value of resistor $R_S$ is made to be much less than that of the resistance $R_T$.

In the operation of the timing circuit shown in FIG. 3, as the light conditions external to the exposure meter vary, because of the cadmium sulfide element which is responsive to the external light, the time duration during which the exposure meter remains in operation also varies. Thus, with low external illumination, the cadmium sulfide element $R_{cds}$ will receive less light and since the resistance value of the photoconductive cadmium sulfide element varies inversely with the amount of light it receives, the resistance will be increased as light decreases, and the discharge time for the capacitor $C_T$ will be longer. Thus, with low external illumination the light measurement time duration during which the exposure meter is in operation is longer. With more external illumination, the cadmium sulfide element will receive greater light resulting in a reduced resistance whereby the light measurement time duration of the exposure meter operation is shorter. The above result corresponds to the general characteristic of the exposure meter itself so that a reasonable light measurement can be carried out.

Because of the switch $SW_2$ and the series-connected resistor $R_S$, which is of relatively low resistance value, by closing the switch $SW_2$ the capacitor $C_T$ will rapidly discharge. Thus, in case light measurement is completed in a shorter time than the predetermined one provided by the resistor $R_T$ or the resistor $R_T$ in series with the cadmium sulfide element, it is possible for the user to close the switch $SW_2$ thereby rapidly discharging the capacitor $C_T$ through the resistor $R_S$ and thereby cutting off the transistor $T_1$ in a time shorter than the predetermined time. Thus, less energy is utilized for the exposure meter and the energy source can be maintained for a longer lifetime. It is also possible to interconnect the switch $SW_2$ with the shutter release button action of the camera to which the exposure meter is coupled. In this manner, after the exposure meter has been energized and the light measurement obtained, the shutter release on the camera itself is activated to proceed with the exposure of the film. By interconnecting the switch $SW_2$ with the shutter release button action, it is possible to stop the current supply to the exposure meter upon completion of the photographing operation, even though the predetermined time duration for the discharge of the capacitor $C_T$ through $R_T$ and $R_{cds}$ has not expired. Thus, again consumption of current from the energy source can be reduced, thereby maintaining the longevity of the energy source.

Figure 4:
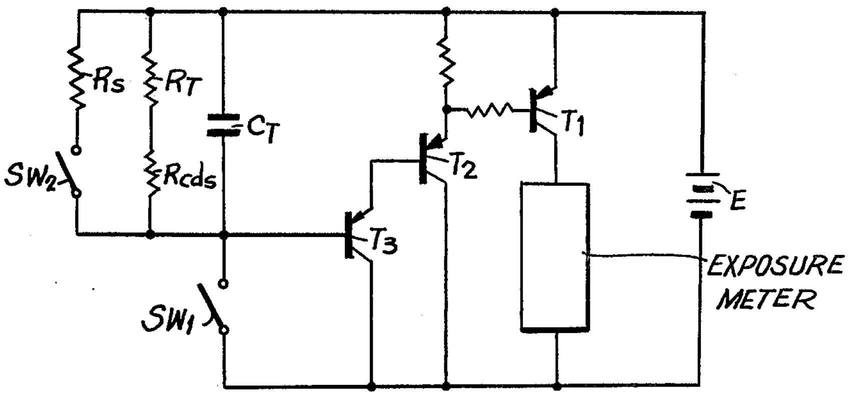
FIG. 4 is a circuit diagram of the second embodiment of the present invention which includes the circuitry of FIG. 3.

Referring now to FIG. 4 there is shown an embodiment of the control circuit of the present invention wherein the timing circuit shown in FIG. 3 is utilized. In addition, between the timing circuit and the grounded-emitter transistor $T_1$ there is provided a buffer circuit having an emitter follower circuit including Darlington-connected transistors $T_2$ and $T_3$ with a large input impedance. The current supply time T during which the exposure meter is energized can be determined by the relationship.

$$T = R_T C_T \ln (E/V)$$

wherein E is the voltage of the energy source and V is the threshhold level of the transistor $T_1$. Thus, the time T can readily be established by determining the resistance value $R_T$ and by knowing the values of the energy source, the transition level and the capacitor.

Since the threshhold level is utilized to provide the transition level between operation and non-operation of the exposure meter, the time duration of operation of the exposure meter can be varied as the threshhold level varies. As is well known, the threshhold level of the transistor has a negative temperature coefficient. Thus, when the temperature is lowered, the threshhold level increases such that the time duration of the operation of the exposure meter decreases. This characteristic also increases the life of the battery, Thus, in utilizing the present invention the energy source is maintained for longer periods of time and unnecessary consumption of energy from the energy source is eliminated.

What is claimed is:

1. A control circuit for controlling the duration of operation of an exposure meter adapted to be energized from an electrical energy source, said control circuit comprising a semiconductor switch including a grounded-emitter transistor means having the exposure meter connected as an output load thereof for passing current from an electrical energy source through the transistor means to the exposure meter, timing circuit means electrically connected to the base of said transistor means for automatically determining the duration of operation thereof and including capacitor means and resistance means connected in parallel, switch means serially connected between said timing circuit means and the electrical energy source for instantaneously charging, when in a closed position, said capacitor means with a voltage which is applied to the base of said transistor mans for rendering it conductive until the voltage across the capacitor means discharges through said resistance means.

2. The combination of claim 1 and comprising additional resistance means electrically interconnected between said timing circuit means and the base of said transistor means.

3. The combination of claim 1 and wherein a buffer circuit means including Darlington-connected transistors having a high input impedance is connected between said timing circuit means and the base of said transistor means.

4. The combination as in claim 1 and wherein said resistance means includes a photosensitive resistor for producing a resistance which varies inversely with the light intensity.

5. The combination of claim 4 and wherein said photosensitive resistor is a cadmium sulfide element.

6. The combination of claim 1 and including a series circuit having an additional switch means and a resistor connected in series therewith and having a resistance value less than the resistance value of said resistance means, said series circuit being in parallel with said capacitor means so that closure of said additional switch means causes said capacitor means to rapidly discharge through said resistor of said series circuit.

7. The combination of claim 1 and wherein said switch means automatically opens after an initial closure.

8. The combination of claim 1 and wherein said switch means is of the push button type.

9. The combination of claim 1 and wherein the electrical energy source is a battery.

* * * * *